US009116681B2

United States Patent
Mauceri, Jr. et al.

(10) Patent No.: US 9,116,681 B2
(45) Date of Patent: Aug. 25, 2015

(54) WORKFLOW SCHEDULE AUTHORING TOOL

(71) Applicants: Robert J. Mauceri, Jr., Seattle, WA (US); Alexander Malek, Seattle, WA (US); Stuart B. Kolodner, Bellevue, WA (US); Charles W. Parker, Sammamish, WA (US); Phillip D. Allen, Redmond, WA (US)

(72) Inventors: Robert J. Mauceri, Jr., Seattle, WA (US); Alexander Malek, Seattle, WA (US); Stuart B. Kolodner, Bellevue, WA (US); Charles W. Parker, Sammamish, WA (US); Phillip D. Allen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 13/673,773

(22) Filed: Nov. 9, 2012

(65) Prior Publication Data

US 2013/0132928 A1    May 23, 2013

Related U.S. Application Data

(63) Continuation of application No. 10/955,659, filed on Sep. 30, 2004, now Pat. No. 8,332,809.

(51) Int. Cl.
*G06F 9/44* (2006.01)
*G06F 9/45* (2006.01)
*G06Q 10/10* (2012.01)

(52) U.S. Cl.
CPC . *G06F 8/30* (2013.01); *G06Q 10/10* (2013.01)

(58) Field of Classification Search
None
See application file for complete search history.

(56) References Cited

U.S. PATENT DOCUMENTS

| 5,930,512 A | 7/1999 | Boden et al. |
| 6,289,513 B1 * | 9/2001 | Bentwich ............. 717/106 |
| 7,043,714 B2 * | 5/2006 | Lin et al. ............. 717/102 |
| 2003/0191769 A1 | 10/2003 | Crisan et al. |
| 2005/0203939 A1 | 9/2005 | Kartzmark et al. |
| 2006/0070025 A1 | 3/2006 | Mauceri, Jr. et al. |

FOREIGN PATENT DOCUMENTS

| JP | 2002074253 A | 3/2002 |
| KR | 1020040079337 A | 9/2004 |
| WO | WO 01/75747 A1 | 10/2001 |
| WO | WO 2004/070527 A2 | 8/2004 |

OTHER PUBLICATIONS

"Office Action Issued in Indian Patent Application No. 1567/DEL/2005", Mailed Date: Aug. 22, 2014, 2 pages.

(Continued)

*Primary Examiner* — Qamrun Nahar
(74) *Attorney, Agent, or Firm* — Tom Wong; Jim Ross; Micky Minhas (57) ABSTRACT

A workflow schedule authoring tool enables a user to author a workflow by arranging building blocks in a particular order. Building blocks may correspond to events, conditions or actions. Each building block is associated with source code that defines an action to be taken when the building block is processed. The order of the building blocks determines the workflow schedule process. The building blocks allow a user to establish logic conditions for how the tasks in the workflow schedule are executed. A building block may require a user to input parameters before the building block may be executed. The workflow schedule is associated with an event such that the workflow schedule triggers when the event occurs. The building blocks simplify workflow schedule authoring because the user does not need to write any code.

20 Claims, 7 Drawing Sheets

(56) References Cited

OTHER PUBLICATIONS

EP Examination Report in EP Application No. 05105593.7 mailed Mar. 1, 2007, 5 pgs.
European Acknowledgement of Withdrawal in Application 05105593.7, mailed Oct. 4, 2012, 1 pg.
European Search Report in EP Application No. 05105593.7 mailed Apr. 6, 2006, 4 pgs.
Japanese Notice of Allowance in Application 2005/183575, mailed Mar. 2, 2012, 6 pgs.
Japanese Patent Application No. 2005-183575, Notice of Rejection mailed Aug. 9, 2011, 8 pgs.
Korean Notice of Preliminary Rejection in Application 10-2005-57857, mailed Oct. 10, 2011, 4 pgs.
Mohan, Rakesh et al., "A State Machine Based Approach for a Process Driven Development of Web-Applications", Advanced Information Systems Engineering: 14th International Conference, CAiSE 2002, Toronto, Canada, May 27-31, 2002, Proceedings, Springer Verlag, New York, NY, USA, vol. 2348, pp. 52-66.
Mohan, Rakesh et al., "A State Machine Based Approach for a Process Driven Development of Web-Applications," IBM Research Report, Feb. 2002, RC22327 (W0202-020), URL, http://www.ifs.tuwien.ac.at/~js/download/caise2002.pdf, 17 pgs.
Response to EP Examination Report, EP Application No. 05105593.7 filed Jul. 4, 2007, 11 pgs.
U.S. Appl. No. 10/955,659, filed Sep. 30, 2004, Amendment and Response filed Jan. 10, 2008, 8 pgs.
U.S. Appl. No. 10/955,659, filed Sep. 30, 2004, Amendment and Response filed Jan. 4, 2010, 14 pgs.
U.S. Appl. No. 10/955,659, filed Sep. 30, 2004, Amendment and Response filed Oct. 22, 2008, 11 pgs.
U.S. Appl. No. 10/955,659, filed Sep. 30, 2004, Amendment and Response filed Nov. 9, 2011, 9 pgs.
U.S. Appl. No. 10/955,659, filed Sep. 30, 2004, Amendment and Response filed Dec. 7, 2010, 13 pgs.
U.S. Appl. No. 10/955,659, filed Sep. 30, 2004, Amendment and Response filed Feb. 17, 2009, 13 pgs.
U.S. Appl. No. 10/955,659, filed Sep. 30, 2004, Amendment and Response filed Apr. 21, 2010, 14 pgs.
U.S. Appl. No. 10/955,659, filed Sep. 30, 2004, Amendment and Response filed Apr. 28, 2008, 15 pgs.
U.S. Appl. No. 10/955,659, filed Sep. 30, 2004, Amendment and Response filed May 31, 2011, 15 pgs.
U.S. Appl. No. 10/955,659, filed Sep. 30, 2004, Amendment and Response filed Jun. 1, 2009, 9 pgs.
U.S. Appl. No. 10/955,659, filed Sep. 30, 2004, Final Office Action Jul. 22, 2008, 11 pgs.
U.S. Appl. No. 10/955,659, filed Sep. 30, 2004, Final Office Action Jul. 7, 2010, 13 pgs.
U.S. Appl. No. 10/955,659, filed Sep. 30, 2004, Final Office Action Sep. 4, 2009, 12 pgs.
U.S. Appl. No. 10/955,659, filed Sep. 30, 2004, Notice of Allowance mailed Nov. 28, 2011, 10 pgs.
U.S. Appl. No. 10/955,659, filed Sep. 30, 2004, Notice of Allowance mailed Aug. 9, 2012, 5 pgs.
U.S. Appl. No. 10/955,659, filed Sep. 30, 2004, Notice of Non-Responsive Amendment mailed Mar. 27, 2008, 4 pgs.
U.S. Appl. No. 10/955,659, filed Sep. 30, 2004, Notice of Non-Responsive Amendment mailed May 1, 2009, 3 pgs.
U.S. Appl. No. 10/955,659, filed Sep. 30, 2004, Office Action mailed Jan. 21, 2010, 11 pgs.
U.S. Appl. No. 10/955,659, filed Sep. 30, 2004, Office Action mailed Jan. 28, 2011, 12 pgs.
U.S. Appl. No. 10/955,659, filed Sep. 30, 2004, Office Action mailed Oct. 10, 2007, 14 pgs.
U.S. Appl. No. 10/955,659, filed Sep. 30, 2004, Office Action mailed Nov. 17, 2008, 10 pgs.
U.S. Appl. No. 10/955,659, filed Sep. 30, 2004, Office Action mailed Aug. 16, 2011, 13 pgs.

* cited by examiner

WORKFLOW SCHEDULE AUTHORING TOOL

The present application is a continuation of, and claims priority to, U.S. Pat. No. 8,332,809 filed on Sep. 30, 2004, entitled "Workflow Schedule Authoring Tool" which is assigned to the assignee of the present invention and is hereby incorporated by reference in its entirety.

BACKGROUND OF THE INVENTION

A workflow defines a series of tasks within an organization to produce a final outcome. Workflows allow for business process formalization and management. A workgroup computing application allows different workflows to be defined for different types of jobs. For example, in a publishing setting, a document may be automatically routed from writer to editor to proofreader to production. At each stage in the workflow, one individual or group is responsible for a specific task. Once the task is complete, the workflow software ensures that the individuals responsible for the next task are notified and receive the data needed to execute the next stage of the process.

Workflows are commonly authored by software engineers. Applications often include many predefined workflows that target common scenarios. However, the predefined workflows cannot possibly meet the needs of all users. Those who are not familiar with writing source code or who are not privileged to access the source code associated with the workflows cannot create, customize or edit the predefined workflows.

SUMMARY OF THE INVENTION

A workflow schedule authoring tool enables a user to author a workflow by arranging building blocks in a particular order. Building blocks may correspond to events, conditions or actions. Each building block is associated with source code that defines an action to be taken when the building block is processed by a workflow execution engine in a web-application server. The order of the building blocks determines the workflow schedule process. Some building blocks may be predefined for commonly used actions. Other building blocks may be customized to execute a specific function or to provide a solution to a unique problem. The building blocks simplify workflow schedule authoring because the user does not need to write any code. The workflow scheduling authoring tool may arrange the building blocks to create logic conditions such that the building blocks execute when the condition is true. The workflow scheduling authoring tool may also arrange the building blocks to create looping logic such that the building block is executed as long as a condition remains true. A building block may require a user to input parameters before the building block may be executed. Before the workflow schedule is processed the server may validate the workflow schedule to ensure proper operation. The workflow schedule may require input from a user during processing. The workflow schedule is associated with an event such that the workflow schedule triggers when the event occurs.

DETAILED DESCRIPTION OF THE PREFERRED EMBODIMENT

Briefly described, a workflow schedule authoring tool enables a user to author a workflow by arranging building blocks in a particular order. Building blocks may correspond to events, conditions or actions. Each building block is associated with source code that defines an action to be taken when the building block is processed by a workflow execution engine in a web-application server. The order of the building blocks determines the workflow schedule process. Some building blocks may be predefined for commonly used actions. Other building blocks may be customized to execute a specific function or to provide a solution to a unique problem. The building blocks simplify workflow schedule authoring because the user does not need to write any code. In one embodiment, existing workflow schedules may be used in conjunction with building blocks to create a new workflow schedule. Any existing workflow schedules that are available on server are loaded onto a user interface such that the user may edit an existing workflow schedule or incorporate the existing workflow schedules in a new workflow schedule.

The workflow scheduling authoring tool may arrange the building blocks to create logic conditions such that the building blocks execute when the condition is true. The workflow scheduling authoring tool may also arrange the building blocks to create looping logic such that the building block is executed as long as a condition remains true. Logic implementation provides flexibility and customization for the workflow schedule. The workflow schedule executes an action depending on which logic condition is met. A building block may require a user to input parameters before the building block may be executed.

The workflow schedule is associated with an event such that the workflow schedule triggers when the event occurs. A workflow schedule may require input from a user during processing. Processing of the workflow schedule may be halted or delayed until the required input are received from the user. The workflow schedule continues processing when the input is received.

Before the workflow schedule is processed the server may validate the workflow schedule to ensure proper operation. Validation may be performed to determine that all the required parameters have been properly set for the building blocks. Validation may also be performed to determine whether the building blocks are properly arranged.

Illustrative Operating Environment

Figure 1:
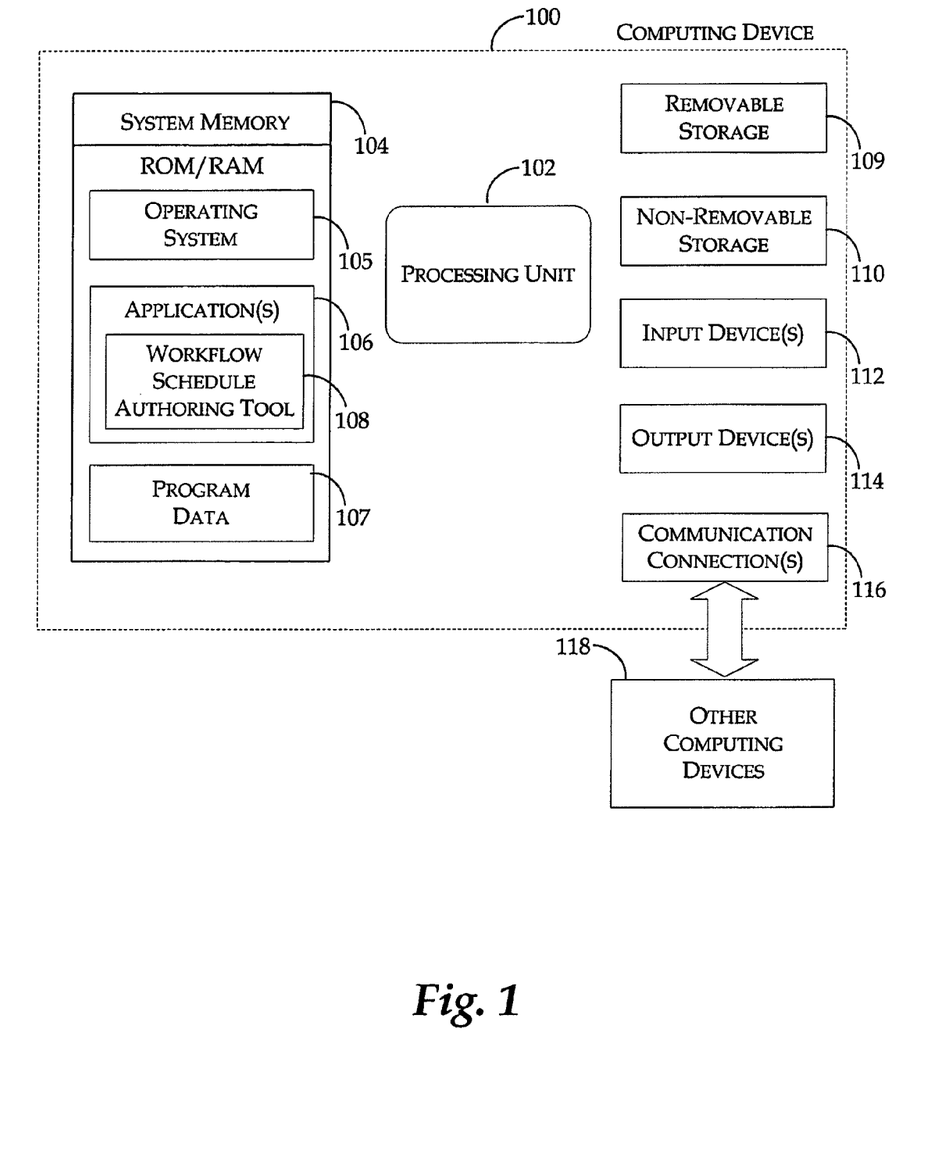
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A workflow schedule authoring tool 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Workflow Schedule Authoring Tool

Figure 2:
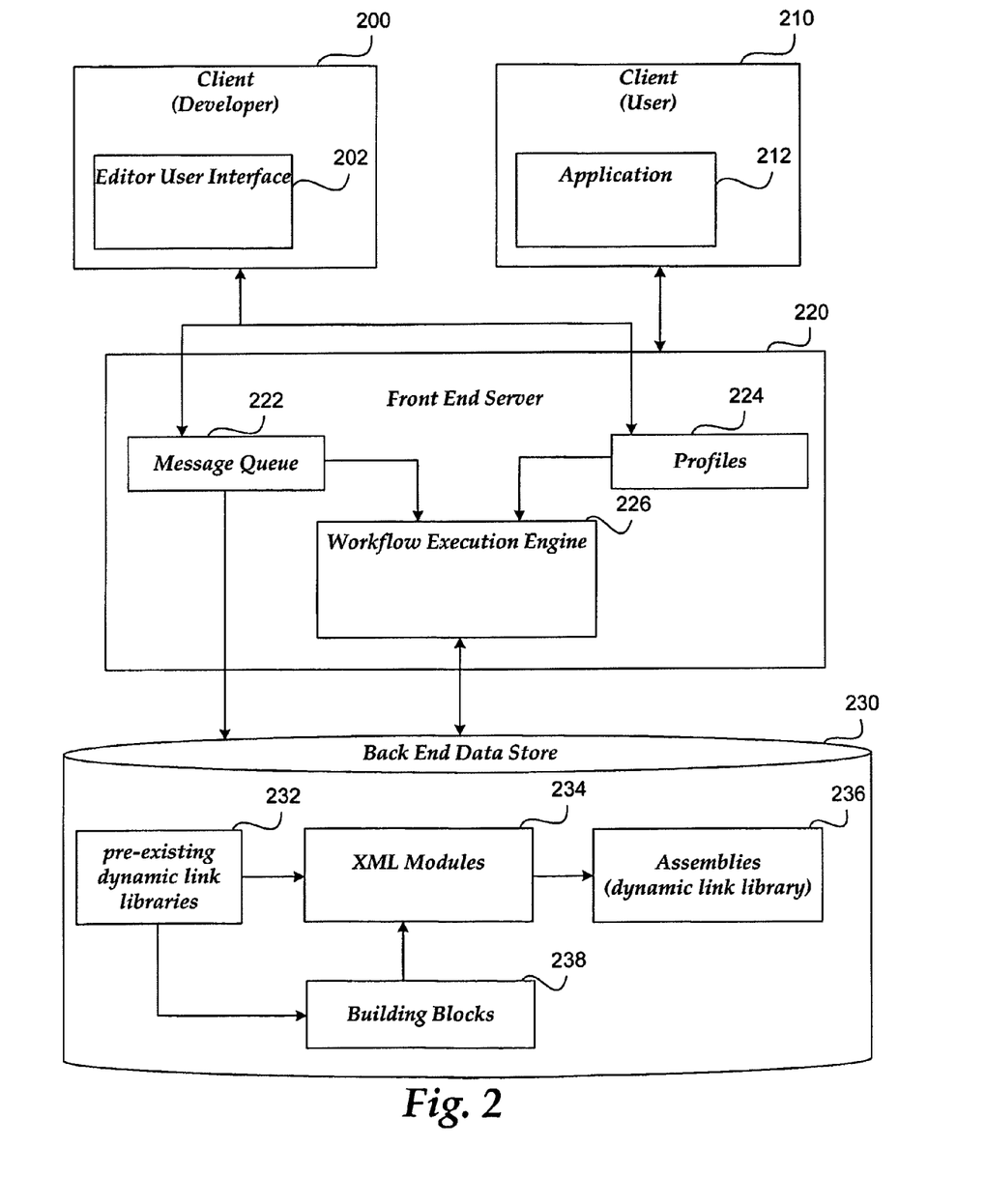
FIG. 2 illustrates a block diagram of a system for authoring a workflow schedule, in accordance with the present invention.

FIG. 2 illustrates a block diagram of a system for authoring a server-based process. The system includes a client 200 for developer access, a client 210 for user access, a front end server 220, and a back end data store 230. Client 200, client 210 and back end data store 230 are each coupled to front end server 220. Client 200 includes editor user interface 202. Client 210 includes application 212. Front end server 220 includes messaging queue 222, profiles 224, and workflow execution engine 226. Back end data store 230 includes pre-existing dynamic link libraries 232, XML modules 234, and assemblies 236. Building blocks 238 are coupled to XML modules 234.

In one embodiment, the server-based process is a workflow schedule that includes a series of tasks. The workflow schedule is authored by a developer at client 200 using editor user interface 202. The workflow schedule may receive input from a user interacting with application 212 at client 210 while the workflow schedule is being processed. Processing of the workflow schedule may be halted or delayed until the required input is received from client 210. The workflow schedule continues processing when the input is received.

Messaging queue 222 is propagated across all front ends of server 220 in order to coordinate incoming and outgoing messages into the server system. Profiles 224 includes identification information related to clients 200, 210 such that a particular client may be located. Workflow execution engine 226 manages execution of the workflow schedule. For example, workflow execution engine may manage the workflow schedule by reordering a sequence of steps or by changing a sequence of steps to execute in parallel or serially.

Pre-existing dynamic link libraries 232 are functions that may be called by XML modules 234 such that all functions do not need to be constructed. Pre-existing dynamic link libraries 232 are abstracted by building blocks 238 (i.e., a pre-existing dynamic link library is referenced by using a building block). XML modules 234 are compiled to form assemblies 236. Assemblies 236 are execution-ready dynamic link libraries.

Building blocks 238 are sections of XML that comprise workflow actions. The action associated with the building block is executed when the building block is processed by workflow execution engine 222. The workflow schedule is authored by arranging building blocks 238 in a particular order. The order determines the workflow schedule process. Some building blocks may be predefined for commonly used actions. Other building blocks may be customized to execute a specific function or to provide a solution to a unique problem. Building blocks 238 simplify workflow schedule authoring because the user does not need to write any code.

Building blocks 238 allow a developer to establish logic conditions for how the tasks in the workflow schedule are executed. For example, building blocks 238 may be arranged with logic connectors (e.g., AND, OR, ELSE, etc.) to provide branching and/or looping in the workflow schedule. Logic implementation provides flexibility and customization for the workflow schedule. For example, the logic may cause the workflow schedule to forward an expense report document to a specific person for approval when the expense is below a particular amount, and forward the expense report document to a different person when the expense report exceeds the amount.

An example workflow schedule is listed below:

| | |
|---|---|
| Event | When a document is uploaded to "Shared Documents" |
| Condition 1 | If spec_status = ready for review |
| Action 1 | Send e-mail to users' Product Team |
| Condition 2 | Else |
| Action 2 | Set spec_staus to Pri1 |

Processing the workflow schedule begins when an event associated with the workflow assembly occurs. In one embodiment, the workflow schedule is associated with a button on a web page, and the event occurs when the button is activated. In another embodiment, the event occurs when client performs an operation that requires interaction with the workflow schedule. For example, the workflow schedule may be designed to generate an e-mail when a document in a document library is updated, such that the document is sent via e-mail to another user for approval. Thus, workflow schedule processing is triggered when the document is updated.

The workflow schedule executes an action depending on which logic condition is met. Each event, condition, and action may be represented as one separate building block. Thus, the workflow schedule shown above is authored by ordering five building blocks without writing any source code.

Figure 3:
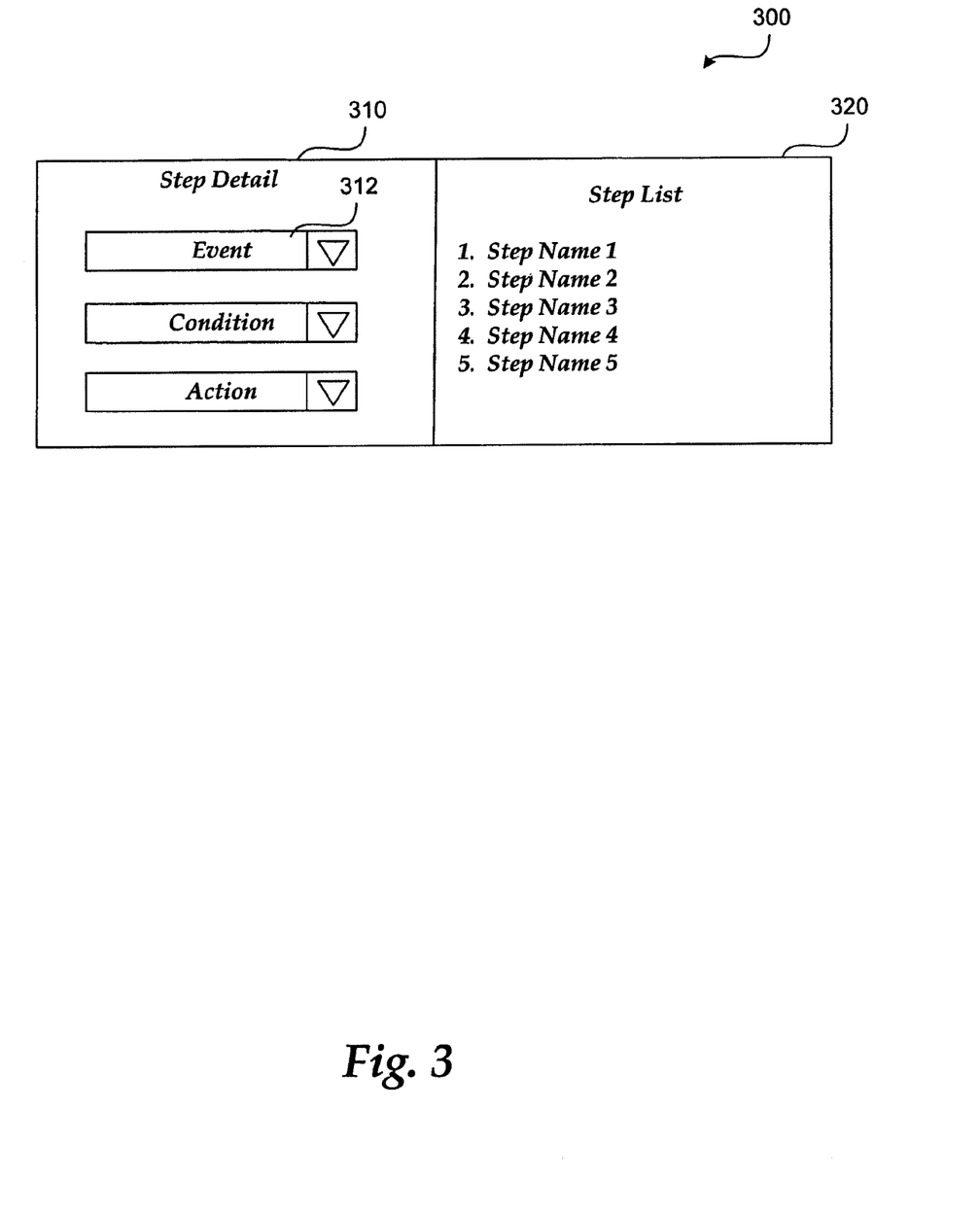
FIG. 3 illustrates an exemplary user interface for authoring a workflow schedule, in accordance with the present invention.

The workflow schedule is created on an editor user interface 300 as illustrated in FIG. 3. Editor user interface shows step detail 310 and step list 320. The building blocks (e.g., events, conditions and actions) may be selected using menus 312. Each step in the workflow schedule is named (e.g., step name 1, step name 2, etc.). Step list 320 shows the step names of the workflow schedule. Each step includes building blocks that are executed before the next step in the workflow schedule may be executed. The selected building blocks are listed in step list 320.

Referring back to FIG. 2, a building block may require a developer to input parameters before the building block may be executed. For example, a developer may select a "send e-mail" building block. A sentence may be generated at editor user interface 202 that reads "e-mail content to user". "Content" and "user" are underlined signaling the developer that those fields require more information. The developer then enters the required information. The developer may click on content and then select a file to be e-mailed. Likewise, the developer may click on user and then select a recipient for the e-mail message. Thus, if the developer selects a document called "my proposal" and a recipient named "Joe" the sentence is changed to "e-mail my proposal to Joe". The workflow schedule may then be saved and forwarded to the server to be compiled.

Figure 4:
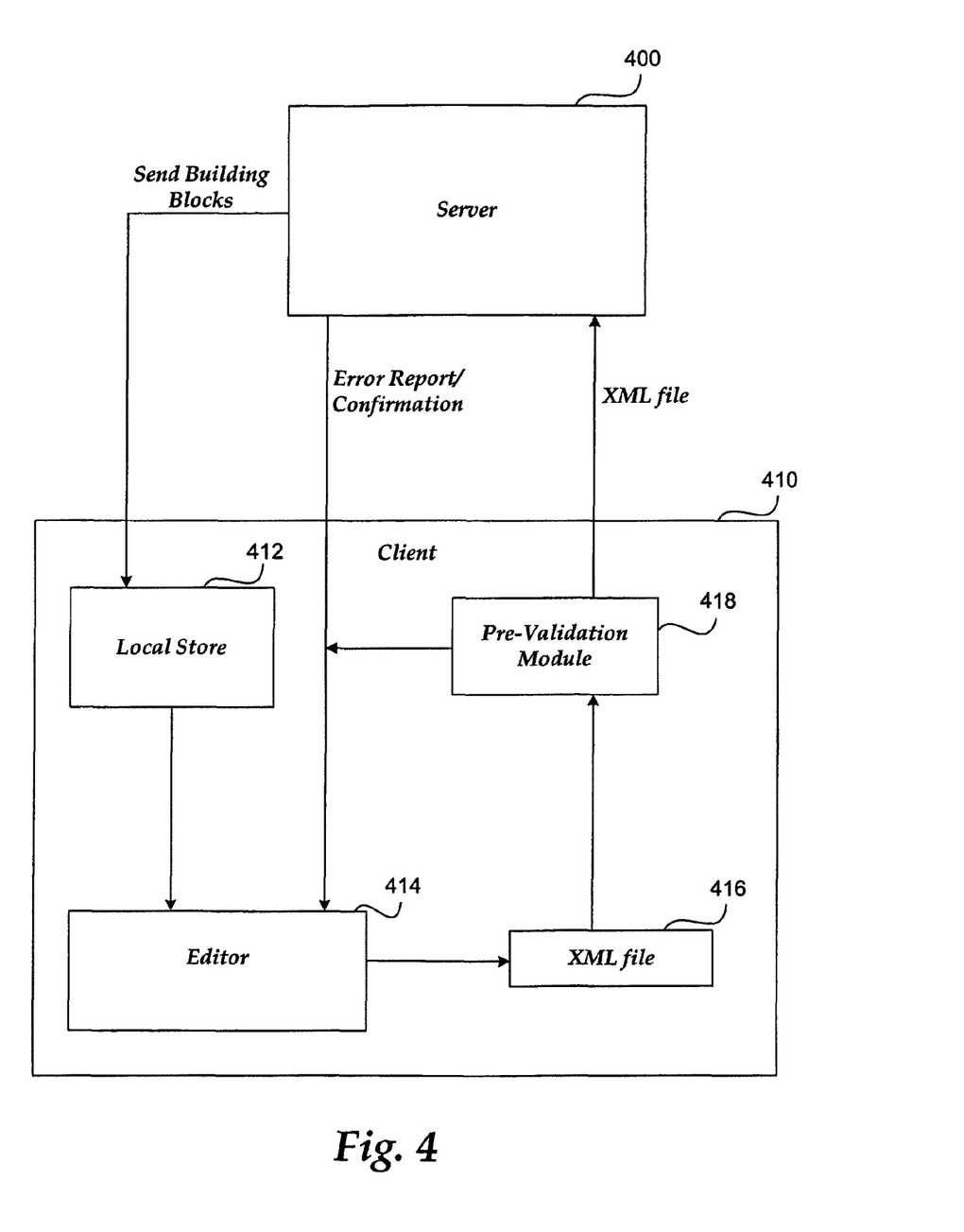
FIG. 4 illustrates a block diagram of a system for authoring a workflow schedule, in accordance with the present invention.

FIG. 4 illustrates a block diagram of a system for authoring a server-based process. The system includes server 400 coupled to client 410. Server 400 includes the front end server and the back end data store shown in FIG. 2. Server 400 may also include multiple front end servers and back end data stores. Client 410 includes local store 412, editor 414, XML file 416, and pre-validation module 418.

Authoring the workflow schedule begins when the building blocks are downloaded from server 400 to client 410. The building blocks are stored in local store 412. The developer authors the workflow schedule using editor 414. In one embodiment, editor 414 is a user interface such as the one described in reference to FIG. 3.

The developer generates the workflow using the building blocks and conditional logic. In one embodiment, existing workflow schedules may be used in conjunction with the building blocks to create a new workflow schedule. Any existing workflow schedules that are available on server 400 are loaded onto client 410 such that the user may edit an existing workflow schedule or incorporate the existing workflow schedules in a new workflow schedule. After the workflow schedule is authored, the developer may save the workflow schedule. The saved workflow schedule is then converted to XML file 416.

XML file 416 is loaded to pre-validation module 418 to check for errors in the syntax and semantics of the building blocks. Pre-validation module 418 may check XML file 416 to determine that all the required parameters have been properly set for the building blocks. Pre-validation module 418 may also determine whether the building blocks are properly arranged. The developer is informed of any syntactical or semantic errors at editor 414. The developer may then correct the workflow schedule. Server 400 compiles XML file 416 to determine that the workflow schedule works properly. Server 400 informs client 410 of the compilation results by generating and sending an error report or confirmation.

Figure 5:
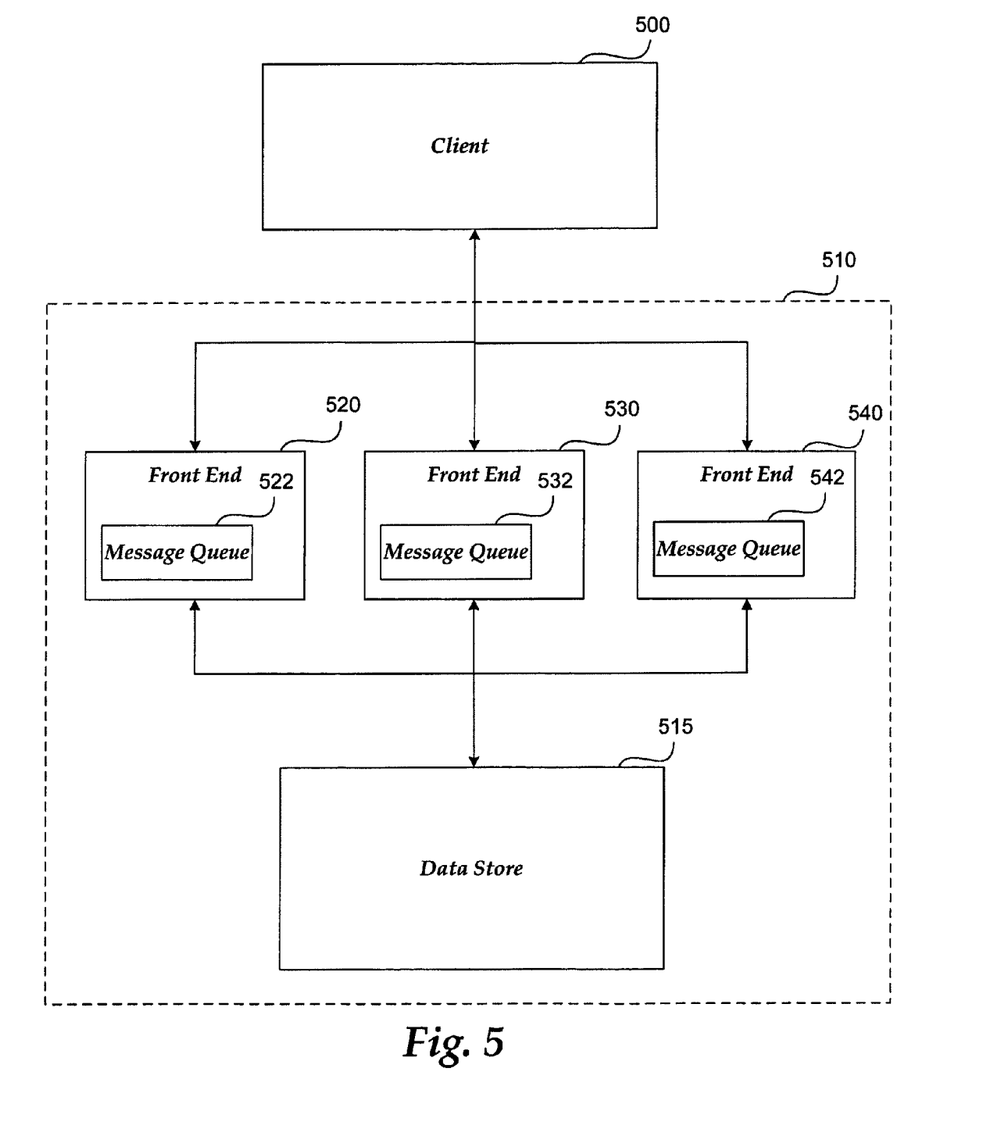
FIG. 5 illustrates a block diagram of a system for authoring a workflow schedule, in accordance with the present invention.

FIG. 5 illustrates a block diagram of a system for authoring a server-based process. The system includes client 500 coupled to server 510. Server 510 includes data store 515 and front ends 520, 530, 540. Message queues 522, 532, 542 are propagated across all front ends 520, 530, 540 to coordinate incoming and outgoing messages into the server system.

Client 500 requests to run a workflow schedule and is brought to a specific front end (e.g., 520). Front end 520 loads the assembly associated with the requested workflow schedule from data store 515. Execution of the workflow schedule is then initiated. One step in the workflow schedule may require input parameters from client 500. Workflow schedule processing may be delayed while waiting for the input parameters. The delay may result in a different front end (e.g., 530) being presented when the user enters the input parameters. Thus, a workflow schedule may be initiated on one front end and continue on a different front end. Front end 530 loads the assembly associated with the current workflow schedule such that workflow schedule processing may continue on front end 530.

Workflow schedules may be modified on server 510. In one embodiment, a workflow schedule (e.g., workflow.dll) may be modified while the workflow schedule is processing. The workflow schedule that is processing is locked such that when processing completes it cannot be processed again. The workflow schedule is then stored in data store 515 under a new name (e.g., workflow.dll.mod). The modified work schedule is linked to the original workflow schedule such that any calls to the pre-modified version of the workflow schedule are routed to the modified version of the workflow schedule.

The workflow schedule authoring tool of the present invention is compatible with workflow schedules that have been authored by other means. The workflow schedule is imported and preserved as much as possible. The portions of the workflow schedule that are understood by the workflow execution engine are processed. Any portions of the workflow schedule that cannot be understood by the workflow execution engine are presented with an indicator that the workflow schedule is not entirely understood by the workflow schedule authoring tool.

Figure 6:
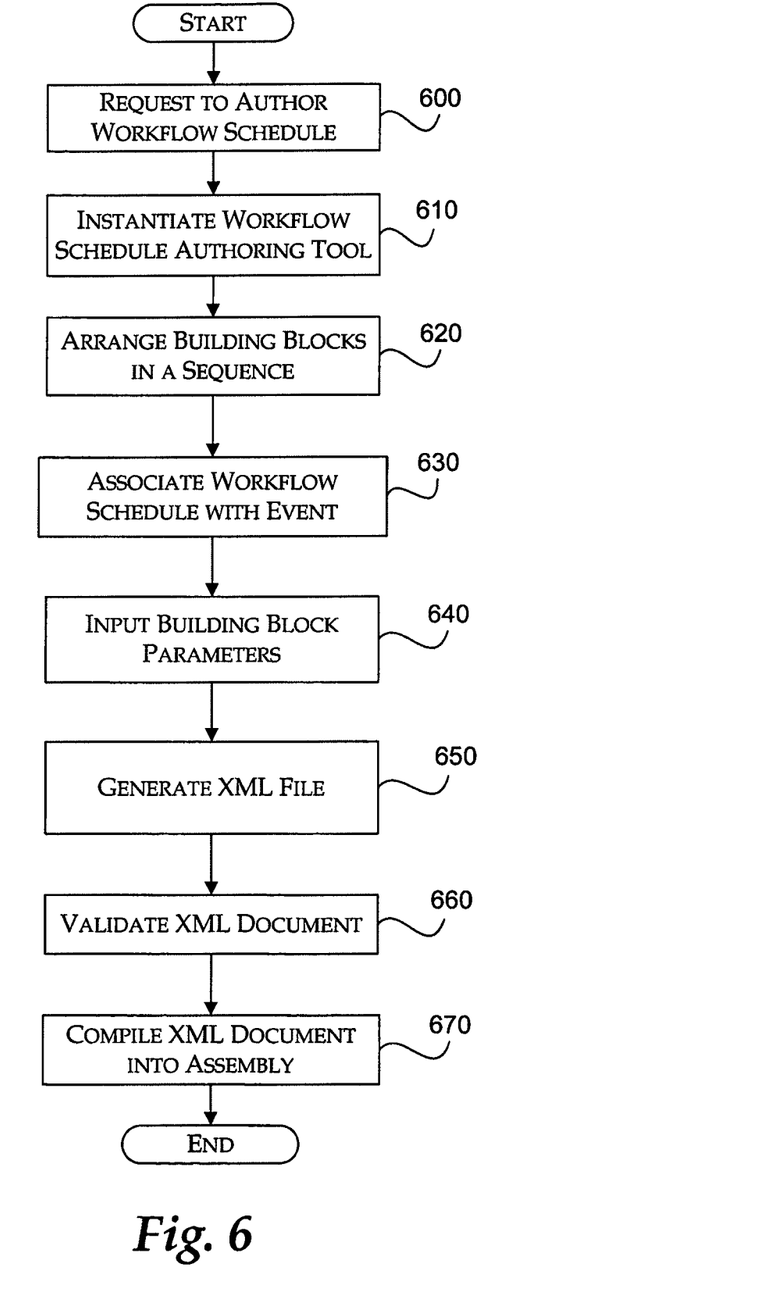
FIG. 6 is an operational flow diagram illustrating a process for authoring a workflow schedule, in accordance with the present invention.

FIG. 6 is an operational flow diagram illustrating a process for authoring a workflow schedule. The process begins at a start block where building blocks for authoring a workflow schedule and existing workflow schedules are available on a server. Moving to block 600, a developer requests to author a workflow schedule from a user interface on a client.

Advancing to block 610, the workflow schedule authoring tool is instantiated. A server loads the available workflow schedules and building blocks to the client. The function of each building block is defined in source code associated with the building block. The function is executed when the building block is processed. A building block may be predefined to execute a common function. Alternatively, the building block may be customized to address specific user needs.

Continuing to block 620, the building blocks are arranged in a particular sequence. The building block sequence determines the process for executing the workflow schedule. In one embodiment, the building blocks may be arranged to include logic conditions for executing the workflow schedule such that the building blocks are not executed sequentially. In another embodiment, existing workflow schedules may be edited or arranged with other workflow schedules and/or building blocks to create a new workflow schedule.

Advancing to block 630, the workflow schedule is associated with an event. The workflow begins processing when the event occurs. In one embodiment, the event may be the activation of a button on a web page. In another embodiment, the event may be a user interaction with the workflow schedule.

Transitioning to block 640, the user inputs parameters for the building blocks. The parameters allows the user to customize the building block. Examples of parameters include a filename, an e-mail address, and a uniform resource locator.

Proceeding to block 650, an XML document is generated from the workflow schedule created from the building blocks and the pre-existing workflow schedules. The XML document includes the source code associated with the workflow schedule.

Continuing to block 660, the XML document is validated. Validation determines that the user has entered all the necessary parameters for the building blocks, and that the building blocks are properly sequenced. If the content or arrangement of the building blocks is invalid, the user is prompted to address the error. Moving to block 670, the XML document is compiled into an assembly. The assembly is an execution-ready dynamic link library. The validated and compiled assembly is available on a front end of the server. Processing then terminates at an end block.

Figure 7:
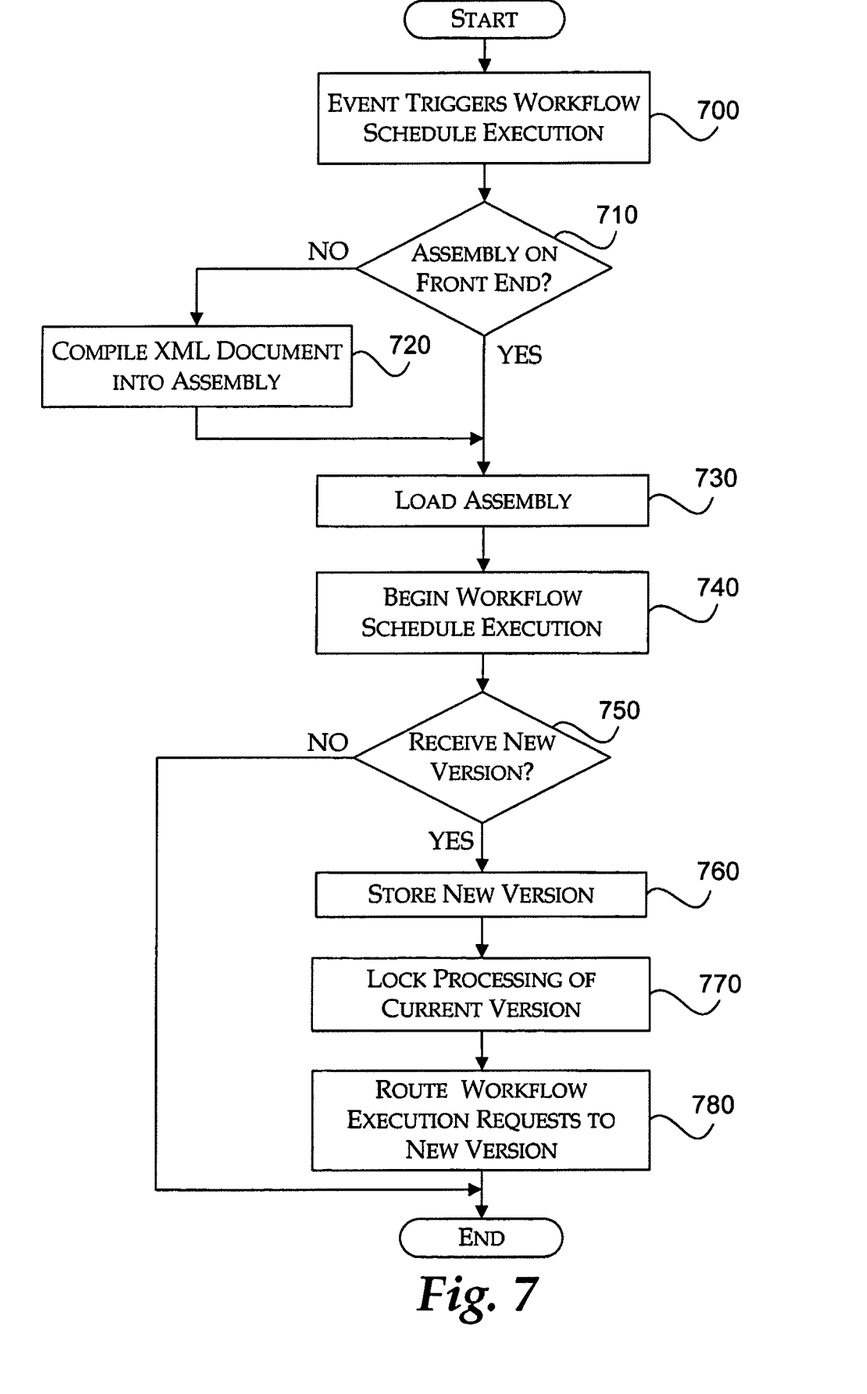
FIG. 7 is an operational flow diagram illustrating a process for executing a workflow schedule, in accordance with the present invention.

FIG. 7 is an operational flow diagram illustrating a process for executing a workflow schedule. The process begins at a start block where the validated workflow schedule is available on the server.

Moving to block 700, an event that triggers workflow schedule execution occurs. Continuing to decision block 710, a determination is made whether the assembly is available on the front end of the server. The assembly may not be available on the front end because execution of the workflow schedule may have initiated on one front end and continued on another front end as described above. If the assembly is not available on the front end of the server, processing moves to block 720 where the XML document is compiled into an assembly.

Advancing to block 730, the assembly corresponding to the triggered workflow schedule is loaded to the workflow execution engine on the server. Continuing to block 740, the workflow execution engine begins executing the workflow schedule.

Transitioning to decision block 750, a determination is made whether a new version of the workflow schedule is received. The new version of the workflow schedule may be a modified version of the current workflow schedule. If a new version of the workflow schedule is not received, processing moves to an end block and terminates. If a new version of the workflow schedule is received, processing moves to block 760 where the new workflow schedule is stored.

Moving to block 770, processing of the current workflow schedule version is locked. A locked workflow schedule is not executed after processing completes. Continuing to block 780, workflow execution requests are routed to the new version of the workflow schedule. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for authoring a workflow process, the method comprising:
    selecting two or more building blocks from a plurality of predefined building blocks, wherein each of the building blocks comprise XML code that define workflow actions, and wherein at least one building block from the plurality of predefined building blocks is customizable to allow a user to choose a specific workflow function not provided for by the other predefined building blocks to modify a flow of execution of the workflow;
    arranging the selected two or more building blocks to form a workflow process;
    validating the workflow process, wherein validating the workflow process comprises determining whether predetermined parameters have been set for the selected two or more building blocks and determining whether the selected two or more building blocks are properly arranged; and
    modifying functions for executing the workflow process while the workflow process is running.

2. The method of claim 1, wherein the two or more building blocks are arranged with logical connectors.

3. The method of claim 1, further comprising processing the workflow process when at least a first event associated with the workflow process is triggered.

4. The method of claim 1, wherein at least one of the two or more building blocks receives at least one input parameter.

5. The method of claim 1, wherein modifying the functions for executing the workflow process comprises combining the workflow process with a pre-existing workflow process.

6. The method of claim 5, further comprising linking the combined workflow process with the workflow process that was not modified.

7. The method of claim 1, further comprising outputting a notification when the workflow process is not validated.

8. A computer-readable storage medium encoding computer executable instructions, which when executed by at least one processor, performs a method for authoring a workflow process, the method comprising:
    selecting two or more building blocks from a plurality of predefined building blocks, wherein each of the building blocks comprise XML code that define workflow actions, and wherein at least one building block from the plurality of predefined building blocks is customizable to allow a user to choose a specific workflow function not provided for by the other predefined building blocks to modify a flow of execution of the workflow;
    arranging the selected two or more building blocks to form a workflow process;
    validating the workflow process, wherein validating the workflow process comprises determining whether predetermined parameters have been set for the selected two or more building blocks and determining whether the selected two or more building blocks are properly arranged; and
    modifying functions for executing the workflow process while the workflow process is running.

9. The computer-readable storage medium of claim 8, wherein the two or more building blocks are arranged with logical connectors.

10. The computer-readable storage medium of claim 8, further comprising instructions for processing the workflow process when at least a first event associated with the workflow process is triggered.

11. The computer-readable storage medium of claim 8, wherein at least one of the two or more building blocks receives at least one input parameter.

12. The computer-readable storage medium of claim 8, wherein modifying the functions for executing the workflow process comprises combining the workflow process with a pre-existing workflow process.

13. The computer-readable storage medium of claim 12, further comprising instructions for linking the combined workflow process with the workflow process that was not modified.

14. The computer-readable storage medium of claim 8, further comprising instructions for outputting a notification when the workflow process is not validated.

15. A system, comprising:
   at least one processor; and
   a memory, coupled to the at least one processor, the memory for storing instructions which, when executed by the at least one processor, performs a method for authoring a workflow process, the method comprising:
      selecting two or more building blocks from a plurality of predefined building blocks, wherein each of the building blocks comprise XML code that define workflow actions, and wherein at least one building block from the plurality of predefined building blocks is customizable to allow a user to choose a specific workflow function not provided for by the other predefined building blocks to modify a flow of execution of the workflow;
      arranging the selected two or more building blocks to form a workflow process;
      validating the workflow process, wherein validating the workflow process comprises determining whether predetermined parameters have been set for the selected two or more building blocks and determining whether the selected two or more building blocks are properly arranged; and
      modifying functions for executing the workflow process while the workflow process is running.

16. The system of claim 15, wherein the two or more building blocks are arranged with logical connectors.

17. The system of claim 15, further comprising instructions for processing the workflow process when at least a first event associated with the workflow process is triggered.

18. The system of claim 15, wherein at least one of the two or more building blocks receives at least one input parameter.

19. The system of claim 15, wherein modifying the functions for executing the workflow process comprises combining the workflow process with a pre-existing workflow process.

20. The system of claim 19, further comprising instructions for linking the combined workflow process with the workflow process that was not modified.

* * * * *